(12) United States Patent
Gloss

(10) Patent No.: US 8,855,006 B2
(45) Date of Patent: Oct. 7, 2014

(54) CAPACITY MANAGEMENT IN MESH NETWORKS

(75) Inventor: Bernd Gloss, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 168 days.

(21) Appl. No.: 13/516,104

(22) PCT Filed: Oct. 27, 2010

(86) PCT No.: PCT/EP2010/066251
§ 371 (c)(1),
(2), (4) Date: Jun. 14, 2012

(87) PCT Pub. No.: WO2011/072933
PCT Pub. Date: Jun. 23, 2011

(65) Prior Publication Data
US 2012/0294186 A1     Nov. 22, 2012

(30) Foreign Application Priority Data

Dec. 15, 2009   (EP) .................................... 09290948

(51) Int. Cl.
*H04L 12/26* (2006.01)
*H04L 12/801* (2013.01)
*H04L 12/24* (2006.01)
*H04L 12/701* (2013.01)
*H04L 12/911* (2013.01)
*H04L 12/721* (2013.01)
*H04L 12/717* (2013.01)

(52) U.S. Cl.
CPC ............ *H04L 41/0896* (2013.01); *H04L 47/15* (2013.01); *H04L 45/00* (2013.01); *H04L 47/782* (2013.01); *H04L 47/823* (2013.01); *H04L 43/0882* (2013.01); *H04L 45/38* (2013.01); *H04L 12/2673* (2013.01); *H04L 45/42* (2013.01); *H04L 45/123* (2013.01)
USPC ............ 370/253; 370/252; 370/254; 370/401

(58) Field of Classification Search
CPC .............................. H04L 41/12; H04L 41/145
USPC .......................... 370/253, 252, 254, 401, 227
See application file for complete search history.

(56) References Cited

U.S. PATENT DOCUMENTS

| 7,773,559 | B2 * | 8/2010 | Chen et al. ..................... 370/329 |
| 8,432,820 | B2 * | 4/2013 | Liu et al. ........................ 370/252 |
| 2005/0208949 | A1 | 9/2005 | Chiueh | |
| 2006/0133404 | A1 * | 6/2006 | Zuniga et al. ................. 370/437 |
| 2006/0159020 | A1 * | 7/2006 | Porat .............................. 370/235 |
| 2009/0213740 | A1 * | 8/2009 | Ganguly et al. .............. 370/252 |

FOREIGN PATENT DOCUMENTS

EP    2 107 735 A1    10/2009

OTHER PUBLICATIONS

International Search Report for PCT/EP2010/066251 dated Dec. 23, 2010.

* cited by examiner

*Primary Examiner* — Rasheed Gidado
(74) *Attorney, Agent, or Firm* — Fay Sharpe LLP

(57) ABSTRACT

The invention relates to a method for mesh-wide capacity management in a mesh network (1), in particular comprising mesh links (2a, 2b) of different link technologies/with different local properties, the method comprising: signalling from at least one link resource manager associated with a mesh link (2a, 2b) or a group (3) of mesh links of the mesh network (1) to at least one network capacity manager (5) information about a calculation model to be applied for calculating at least one flow performance characteristics, in particular a resource consumption, for establishing at least one packet-based traffic flow on the mesh link (2a, 2b) or on the group (3) of mesh links. The invention also relates to a link resource manager, to a network capacity manager (5), to a signaling system, and to a mesh network (1).

10 Claims, 3 Drawing Sheets

CAPACITY MANAGEMENT IN MESH NETWORKS

FIELD OF THE INVENTION

The invention relates to the field of telecommunications, and, more specifically, to capacity management in mesh networks.

BACKGROUND

This section introduces aspects that may be helpful in facilitating a better understanding of the invention. Accordingly, the statements of this section are to be read in this light and are not to be understood as admissions about what is in the prior art or what is not in the prior art.

A mesh network is used for transporting mesh flows, i.e. flows of packets having a unique source and destination node, along fixed paths established between nodes of the network. A path established for such a mesh flow is realized by combining multiple subsequent single-hop transmissions between neighboring mesh nodes, the single-hop transmissions being implemented using wireless or wire-line links, in the following also being referred to as mesh links. Packet forwarding at the mesh relay nodes, i.e., mesh points, is realized based on local packet forwarding information, e.g., based on label-switching after performing a setup-process of mesh flows.

The major application areas of such carrier-class mesh networks are (1) extending radio access networks on a temporary basis for coverage or capacity, e.g., by adding small cells with in-band backhauling and (2) to run temporary communication systems for rescue operations in environments with a broken infrastructure, e.g., after an earth-quake, hurricane or tsunami catastrophes. Supporting a heterogeneous set of link technologies which are integrated into the same mesh network is a requirement in scenarios where different spatial environments have to be traversed with mesh links. Different wireless or wire-line link technologies are typically tailored to different environments as indoor/outdoor and, in the case of wireless link technologies, simple or difficult radio interference situations. Integrating heterogeneous link technologies into a single mesh network allows for providing better/cheaper mesh networks. Moreover, even if only a single link technology is used in a mesh network, that technology may be implemented using different link configurations/different versions of the same technological standard, such that also for mesh networks using a single link technology, a situation which is similar to a network using heterogeneous link technologies may arise.

As wireless (and wire-line) resources are scarce resources—especially since in mesh networks they are also used for backhauling traffic of other links/cells—resource management mechanisms have to be applied in order to avoid network congestions and in order to provide communication services based on agreed service levels. Thus, for providing predictable communication services in mesh networks, an appropriate capacity management system for wireless and/or wire-line resources has to be established.

Such a mesh capacity management system has to be adapted for performing admission control of new mesh flows and for mesh optimizations which re-arrange already established mesh flows inside the mesh network. Admission control decisions (whether to accept new mesh flows or not) are based on calculations of remaining link capacities and calculations of expected flow traffic performance measures. The mesh routing/admission control may do this for different potential paths and selects the best path, if such a path can be established without violating capacity bounds and service quality constraints, e.g., delay, and without interfering with other flows breaking their service level agreements. If these constraints are violated, a request for establishing a new mesh flow on the network will be rejected. When accepting a new mesh flow, the path is configured and possibly resource reservations at the link level are made.

Mesh network admission control and mesh network optimizations are based on the calculation of flow performance characteristics, such as resource consumptions and other flow performance measures, e.g. an expected per-hop delay, which may be used to derive/correspond to fitness values for new potential flow distributions inside the mesh. The fitness values are functions taking remaining link capacities and predicted mesh flow traffic performance parameters into account.

Both types of calculations performed by the capacity management system, i.e. the remaining link capacity calculations as well as predictions of mesh flow traffic performance measures are based on:

(1) fixed properties of mesh links and link groups such as maximum capacity or available physical resources,
(2) on current or hypothetical setups of mesh flows in the mesh, i.e., minimum bitrate, burstiness, and maximum delay, and
(3) on a calculation model how to derive remaining capacities at links and mesh flow traffic performance measures.

Current capacity management systems are based on pre-defined calculation models (3) that are implemented in the capacity management system for calculating resource consumption from link properties (1) and mesh state information (2). Also, traffic characteristics and traffic types of mesh flows may be taken into account for this purpose. The pre-defined calculation models used in mesh capacity management systems know about the link properties and how to calculate remaining link capacities as well as how to calculate the resulting properties of single-hop and end-to-end mesh flow properties. For this purpose, methods known from science and engineering such as teletraffic theory may be applied in order to derive link capacity limits and end-to-end mesh flow transmission properties from mesh state information.

However, the calculation model which has to be applied in a mesh capacity management system has to be known beforehand, i.e. when engineering the mesh system, or even has to be standardized in order to allow an inter-working of mesh links/mesh capacity management of different vendors. Yet, especially for heterogeneous wireless mesh networks, it is difficult to find a one-fits-all calculation model of remaining link capacities and predictions of traffic performance measures. Furthermore, it is difficult to find a generic calculation model that is purely based on link parameters and state information.

SUMMARY

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the invention relates to a method for mesh-wide capacity management in a mesh network, in particular comprising mesh links of different link technologies/different link properties, the method comprising: signalling from at least one link resource manager associated with a mesh link or a group of mesh links of the mesh network to at least one network capacity manager information about a calculation model to be applied for calculating at least one flow performance characteristics, in particular a resource consumption, for establishing at least one packet-based traffic flow on the mesh link or on the group of mesh links.

The solution proposed herein makes use of an abstract representation of calculation models for performing admission control and mesh optimization calculations describing how to combine link parameters and current or hypothetical state information to calculate remaining link capacity and mesh flow traffic performance measures for mesh links. The calculation model is adapted for a particular link/link group which is associated with a (local) link group manger. For transporting information about the calculation model to be applied by the centralized network capacity manager/system in order to calculate a resource consumption on the links associated with a local link resource manager or fitness values for the link group or mesh flows, a signaling sub-system is used. The resource consumption may be based on bit-rates, in particular when the links are implemented in a wire-line technology, or a physical resource consumption (rate) may be derived from the bit-rates, taking cost factors representing the physical resource consumption rate for establishing a packet-based traffic flow, preferably of a given traffic type, on a respective mesh link/group of mesh links into account.

The mesh network may comprise a plurality of link groups, a link group being defined as a plurality of links between nodes that share the same physical resource, i.e., spectrum, time, code, etc.

Local link managers are the authorities which have knowledge about the technological properties of the associated links/link groups, and also on local environmental parameters. This knowledge may include implementation details of media access control mechanisms of the links as well as measurements of environmental properties such as the number of significant interferers.

For managing mesh flows with a multi-hop scope, one or more network capacity manager(s) are provided in the network. They are in charge of doing admission control for new mesh flows, placement of new mesh flows in the mesh network and mesh network optimization by re-ordering of mesh flows.

The network capacity manager(s) communicate with the local link/link group managers, combining them to a mesh using a mathematical (e.g. graph) description. The local link managers provide information about the calculation model and may locally store information about one-hop QoS allocations of the associated links/link groups, in particular if two or more network capacity managers are used. When only a single (centralized) network capacity manager is provided in the network, the information about the one-hop QoS allocations may be stored at a central location, e.g. a data base associated with the centralized network capacity manager.

In one variant, the method further comprises: signalling at least one physical link property and/or link state information about the mesh link or the group of mesh links from the link resource manager(s) to the network capacity manager. As described above, fixed properties of mesh links such as maximum capacity or available physical resources together with link state information on current, i.e. installed, or hypothetical setups of mesh flows in the mesh links, i.e., minimum bitrate, burstiness, and maximum delay may be provided to the network capacity manager as inputs to the link- or link group-specific calculation model.

The calculation models/the information about a link- or link-group specific calculation model which is to be signalled between the link/link group resource managers and the mesh capacity manager(s) may be represented in various forms:

In one variant, the step of signaling information about the calculation model comprises signaling selection information for selecting a specific calculation model from a plurality of pre-defined calculation models. In this case, only an index for indexing one out of a set of well-known/pre-defined calculation models which are known to the network capacity manager(s) and possibly also to the link resource managers may be signalled.

In another variant, the step of signaling information about the calculation model comprises signaling a parameter description of a linear (or non-linear) calculation model. The parameter description of the calculation model may be based e.g. on maps with known parameter values, the maps relating an n-dimensional input parameter space to values of interest.

In a further variant, the step of signaling information about the calculation model comprises signaling a mathematical description of the calculation model, in particular in the form of mathematical equations which may be evaluated by the network capacity manager, the mathematical equations being, e.g., formulated in MathML.

In another variant, the step of signaling information about the calculation model comprises signaling a program code to be executed by the network capacity manager. Although the program code may be written in any programming language, platform-independent script languages such as Java or JavaScript may be of advantage. The transferred program code may be a calculation script which receives the link state information and possibly also the physical link properties as input parameters and generates the resource consumption for establishing a traffic flow on a link/link group as an output.

It will be understood that other ways of signaling relevant information about the calculation model do exist, i.e. the forms of signaling listed above only form a non-exhaustive list. In either case, the signaling system for link capacity and flow performance calculation models as described herein will allow: a) to have mesh networks with different link technologies/specifications using one or multiple integrated (centralized) mesh capacity management system(s) without knowing technical details of the link technologies, b) to make a mesh capacity management system aware about special environmental properties to be taken into account when calculating online-mesh setups which are beyond simple transfer of parameter values, and c) to make the mesh capacity management system robust against future additions of link technologies.

Typically, the network capacity manager(s) performs/perform calculations for establishing new mesh flows and/or for optimizing a distribution of mesh flows in the mesh network, the calculations being based on the information about the calculation model, preferably in addition to link state information about one-hop resource allocations on the mesh links. As described above, the network capacity manager may decide whether or not a new mesh flow can be established in the network, and may also try to optimize the distribution of mesh flows in the network.

A further aspect of the invention relates to a link resource manager for a mesh link or for a group of mesh links of a mesh network, being adapted for signaling information about a calculation model to be applied for calculating at least one performance characteristics/measure, in particular a resource consumption, for establishing at least one packet-based traffic flow on the mesh link or on the group of mesh links to at least one network capacity manager. By performing the calculations for determining the resource consumption in the centralized network capacity manager, overloading the local link/link group managers can be avoided. Since the calculations have not to be performed locally in the link/link group managers, a large number of calculations for different setups may be computed, e.g. using optimization algorithms such as simulated annealing or genetic optimization. The "Soft-QoS management" of the local link/link group managers takes the overall resource availability at links and in link groups into account when placing mesh flows. If no valid paths through the mesh can be detected since at all possible paths at least one of the calculated resource constraints would be exceeded, the new mesh flow will be rejected (admission control).

In one embodiment, the information about the calculation model is selected from the group consisting of: selection information for selecting one calculation model from a plurality of pre-defined calculation models, a parameter description of a calculation model, a mathematical description of the calculation model, and a program code to be executed by the network capacity manager. One skilled in the art will appreciate that the specific type of information to be signaled to the network capacity manager will in general be pre-defined when the link resource manager is set up. Typically, the type of information to be signaled will be chosen in dependence of the link technology used, i.e. depending on linear/non-linear behavior, number of supporting points of a characteristic capacity curve, etc.

A further aspect of the invention relates to a network capacity manager, comprising: a receiving unit adapted for receiving from at least one link resource manager information about a calculation model to be applied for calculating at least one flow performance parameter, in particular a resource consumption, for establishing at least one packet-based traffic flow on at least one mesh link or on at least one group of mesh links, and a calculation unit adapted for performing calculations for establishing new mesh flows and/or for optimizing a distribution of mesh flows in the mesh network based on the information about the calculation model, preferably in addition to link state information about one-hop resource allocations on the mesh links.

In one embodiment, the information about the calculation model is selected from the group consisting of: selection information for selecting a specific calculation model from a plurality of pre-defined calculation models, a parameter description of an in particular linear calculation model, a mathematical description of the calculation model, and a program code to be executed by the network capacity manager. Although the type of information which is transferred from the local link resource manager(s) to the network capacity manager may depend on the link technology (see above), it is preferable to define a single type of information about the calculation model to be signaled from all local link resource managers to the network capacity manager. For instance, all link resource managers may e.g. only transfer mathematical descriptions of the calculation models to the centralized capacity managing system.

The network capacity manager may, for calculating the resource consumption on links and at link-groups, perform the addition of packet traffic flows using statistical multiplexing—as this is known from teletraffic theory. For this, the central mesh capacity manager may provide a context space with information about the link parameters and mesh state information and lets the execution of the calculation model access this context space.

For optimizing the mesh traffic placement, the central network capacity manager may derive from the provided calculation models for the remaining link capacity and for the mesh flow traffic performance an overall fitness function. This fitness function for hypothetic traffic placements can be used as part of optimization steps finding improved mesh flow distributions. Example optimization algorithms for this purpose are genetic algorithms, branch & bounds, and simulated annealing. After finding a better setup, the mesh flows may be re-configured according to the new setup.

In a further embodiment, the calculation unit is adapted for determining the resource consumption for establishing at least one packet-based traffic flow on the at least one mesh link or the at least one group of mesh links, and for comparing the determined resource consumption to a maximum resource capacity of the at least one mesh link or the at least one group of mesh links on which the at least one traffic flow is to be established. The determination of the resource consumption depends on the calculation model used, two simple models for wire-line and wireless link technologies, respectively, being described in the following:

Resource management systems in wire-based systems, e.g., IntServ, know about the resource sharing at links, e.g., for Ethernet links. In a very simple case, the resource consumption for new situations may be calculated based on a linear equation relating the bit-rates $r_i$ of different flows (with index i) installed on a link to a maximum resource capacity $C_{max}$ on that link, according to the following equation:

$$C_{max} \leq \sum_i r_i \qquad (1)$$

For the network capacity manager as a multi-hop resource management system, this only requires signaling of the constant maximum resource capacity $C_{max}$ between the link/link group traffic handler and the centralized network capacity management (signaling of system properties). The resource consumption of installed flows can either be signaled in addition to that (signaling of state information) or may be available at the central network capacity manager. In contrast thereto, in decentralized systems with multiple mesh managers concurrently accessing links, the bit-rates $r_i$ or the calculated current capacity in use have to be signalled.

In wireless access systems, an equation similar to equation (1) may be applied:

$$C_{phys,max} \leq c_{phys}(t) = \sum_i a_i \cdot r_i \qquad (2)$$

Equation (2) is adapted for wireless systems, as it additionally takes the production costs $a_i$ for establishing a flow i on a mesh link into account. The production costs $a_i$ are the relation between a bit transmission/bit rate and consumed physical resources in terms of spectrum×time. As a first assumption, the production costs $a_i$ are directly related with the modulation and coding scheme (MCS) used by the wireless link for a particular mesh flow.

Of course, the simple linear calculation models described above are only a first approximation assuming a perfect resource sharing, which almost never occurs, such that in general, more sophisticated models will have to be used, their link-, resp., link-group specific properties being signalled to the network capacity manager.

A further aspect of the invention relates to a signaling system for a mesh network, comprising: a plurality of link resource managers as described above, each being associated with a respective mesh link or a group of mesh links of the mesh network, and at least one network capacity manager as described above. Such a signaling system may become part of an abstraction interface for mesh systems, especially using heterogeneous link technologies.

Yet another aspect of the invention relates to a mesh network comprising a plurality of mesh links, the mesh network further comprising a signaling system of the type described above. Implementing a mesh network having a signaling system of the type described herein allows for a technology-independent mesh capacity management which allows for inter-working between nodes of different vendors. The mesh network may e.g. be devised as a multi-hop relay system, as they appear in WiMAX 16j or LTE(-Advanced) technology.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE FIGURES

Exemplary embodiments are shown in the diagrammatic drawing and are explained in the description below. The following are shown.

DESCRIPTION OF THE EMBODIMENTS

The functions of the various elements shown in the Figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

Figure 1:
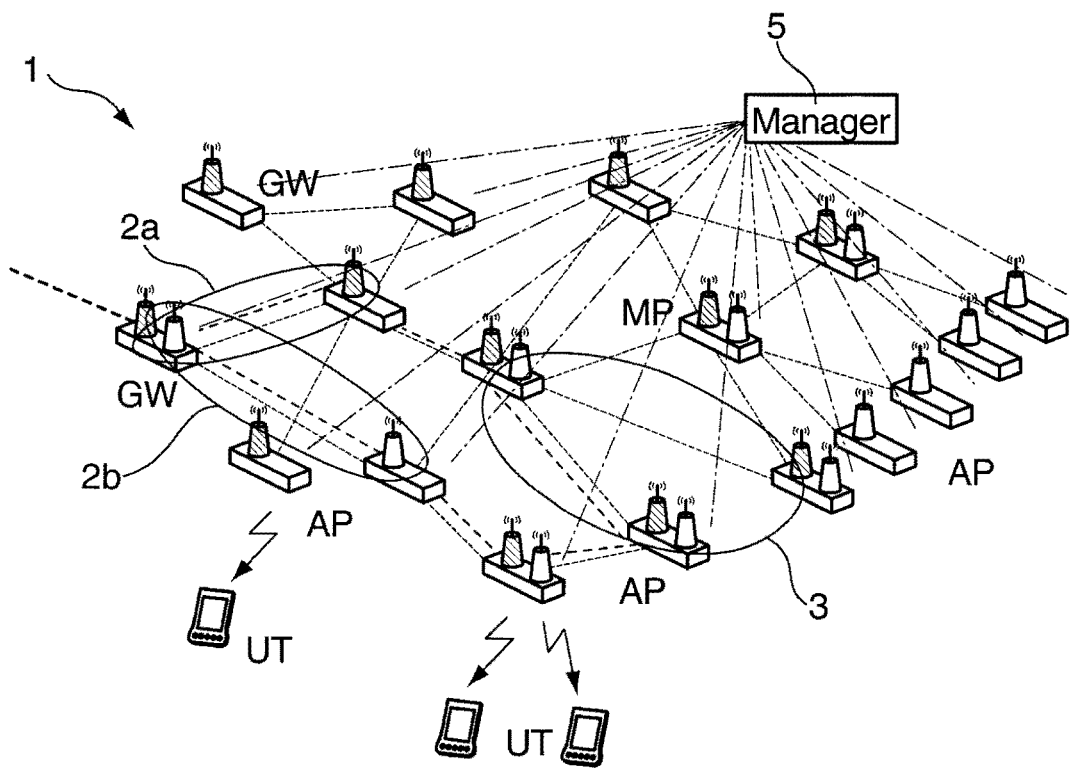
FIG. 1 shows a schematic diagram of a heterogeneous wireless mesh network having a centralized network capacity manager.

FIG. 1 shows an example of a mesh network 1 having a plurality of mesh nodes, each node belonging to one of three different types: A first type of nodes, being designated as gateway nodes GW in the following, is devised for providing a connection of the wireless mesh network 1 to a packet-based core network (e.g. the Internet), the connection of the gateway nodes GW to the core network being implemented e.g. via a wire-line (cable or fiber-based) connection or via a wireless connection (not shown). A second type of nodes are devised as access points AP for providing connection to and exchanging information with a plurality of user terminals UT which may be connected to the wireless mesh network 1. The gateway nodes GW are linked to the access points AP via zero, one or more relay nodes, in the following being referred to as mesh points MP.

The mesh network 1 is devised as a heterogeneous network, i.e. the nodes AP, GW, MP, UT and the links between the nodes are implemented using different link technologies, for example in compliance with the IEEE 802.11 (WiFi) and IEEE 802.16 (WiMAX) standard, respectively. Thus, some of the mesh points MP are adapted to perform communications only using a single link technology, whereas other mesh points MP are adapted for performing transmissions using both link technologies, the latter mesh points MP being represented with two antennas in FIG. 1. It will be understood that a mesh point MP may also use two or more implementations/versions of the same link technology, e.g. two WLAN interfaces adapted for operation at different channels.

The nodes AP, MP, GW of the wireless mesh network 1 are connected via physical (wireless) links (one-hop links), being represented by dashed lines in FIG. 1, the links either being point-to-point links 2a, 2b which are (mutually) realized in disjoint wireless resources or on point-to-multi-point and/or multi-point-to-multi-point link groups 3 comprising a plurality of links sharing the same resources (spectrum, time, code, etc.).

Figure 2:
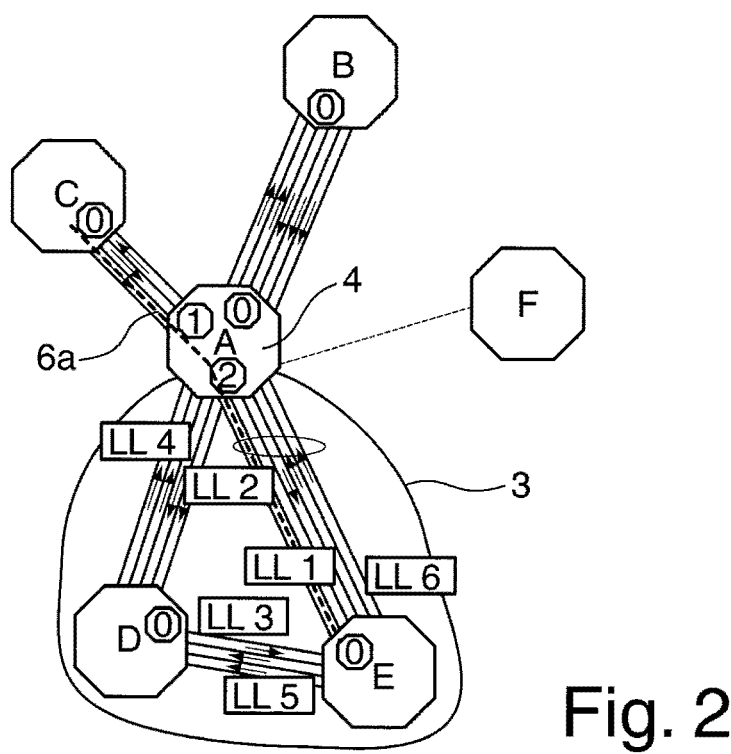
FIG. 2 shows a schematic diagram of a link group of the wireless mesh network of FIG. 1.

An example of a link group 3 of the network 1 of FIG. 1 is shown in greater detail in FIG. 2. In the present example, the link group 3 comprises logical (i.e. directed) links LL1 to LL6 between a first, second and third node A, D, E. In FIG. 2, two further nodes C, B of the wireless mesh network 1 which do not pertain to the link group 3 are also represented, together with a further node F which is connected to the first node A via a physical link which does not pertain to the wireless mesh network 1.

In the following table (Table 1), the logical links LL1 to LL6 of the link group 3 are represented together with the number of the wireless interface (0 or 2) of each node A, D, E on which a respective logical mesh link is installed.

TABLE 1

| Logical Link ID | Source | | Destination | | Estimated Production Cost [Hz × s/Bit/s] | |
|---|---|---|---|---|---|---|
| | Node | IF | Node | IF | VoIP/BE | |
| 1 | A | 2 | E | 0 | 1.1 | 1.4 |
| 2 | A | 2 | D | 0 | 1.4 | 1.7 |
| 3 | D | 0 | E | 0 | 2.1 | 2.2 |
| 4 | D | 0 | A | 2 | 1.7 | 1.9 |
| 5 | E | 0 | D | 0 | 1.8 | 2.1 |
| 6 | E | 0 | A | 2 | 3.1 | 3.3 |

The link group 3 and further link groups are detected and configured in an initial self-configuration phase of the wireless mesh network 1, in which radio parameters, e.g., WLAN channels and OFDMA sub-channel areas, are set and mesh links 2a, 2b and link groups 3 to be used are configured. As stated above, link groups comprise links that share the same physical resource (spectrum×time), which is locally separated by MAC mechanisms of the wireless technologies (lowest time-scale of resource sharing). For each link group, a local link group manager 4 (in the present example, implemented in the first node A) is elected as the ultimate authority for soft-QoS reservations (one-hop QoS allocations) and for influencing local packet handling entities and MAC entities at mesh nodes, serving as an interface to the MAC system. The whole mesh network 1 (i.e., the multi-hop view) is managed by a centralized network capacity manager 5 shown in FIG. 1, which is adapted to communicate with the nodes of the network 1 which are elected as link group resource managers/the nodes which are related to specific links 2a, 2b.

The network capacity manager 5 is informed about all existing link groups 3, either by the mesh self-configuration function or by the link group resource managers 4 themselves. During the registration process, the link group resource managers 4 inform the network capacity manager 5 also about physical link properties of the links of the link group, such as an overall physical resource capacity, possibly together with link state information, for instance about estimates for production cost factors for each logical link (LL1 to LL6 in the present example) for a representative set of traffic types. The production cost factors represent the estimated physical resource consumption rate for establishing a packet-based traffic flow on a respective one of the logical links LL1 to LL6 and are dependent on the link and on the traffic type (instead of the flow), as there is no flow established on a respective link when the estimation is performed. Thus, apart from the physical link properties of the respective mesh link such as a modulation and coding scheme, a Signal-to-Interference and Noise Ratio, a repetition mechanism overhead, a channel coding efficiency, etc., the production cost factor is also dependent on a traffic type, resp. QoS class (Voice, Video, Best Effort, etc.) of the mesh flow to be established on a respective link LL1 to LL6, as can be easily seen from the following link group resource allocation table, also comprising information about a maximum delay time on a respective link LL1 to LL6:

TABLE 2

| QoSAlloc ID | Logical Link ID | (minimum) guaranteed Bitrate (Bit/s) | Max Delay (ms) | Type | Used Production Cost Factor (Hz × s/Bit/s) M = Measured C = Calculated |
|---|---|---|---|---|---|
| 1 | 1 | 100000 | 50 | BE | 1.1 (M) |
| 2 | 1 | 100000 | 10 | Voice | 1.7 (C) |
| 3 | 2 | 200000 | 20 | Video | 1.3 (M) |
| 4 | 2 | 200000 | 50 | BE | 2.1 (M) |
| 5 | 3 | 115000 | 30 | BE | 1.1 (M) |
| 6 | 4 | 120000 | 10 | Voice | 2.1 (M) |
| 7 | 4 | 50000 | 5 | Voice | 2.2 (M) |
| 8 | 5 | 64000 | 50 | BE | 1.1 (C) |
| 9 | 5 | 72000 | 100 | BE | 1.7 (C) |
| 10 | 6 | 180000 | 20 | Voice | 2.1 (C) |

The values shown in Table 2 are a snap-shot of the state information available in the link group resource manager 4, the state information being regularly updated, e.g. when new flows are instantiated. A—possibly not up-to-date—copy of the state information is available in the network capacity manager 5.

Figure 3:
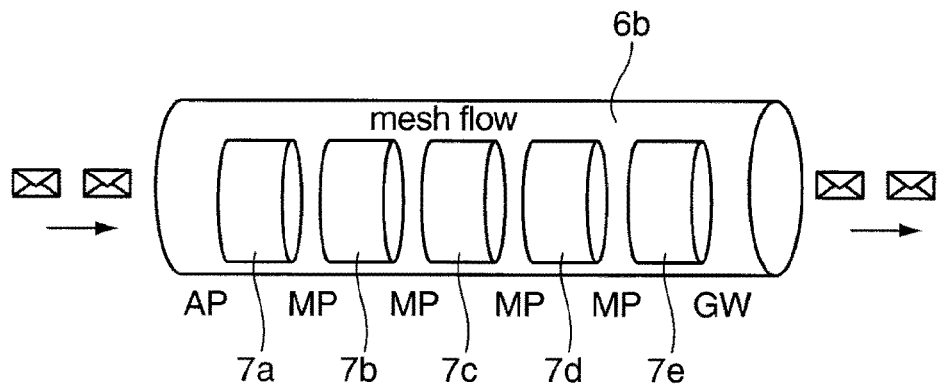
FIG. 3 shows a schematic diagram of a typical mesh flow in the wireless mesh network of FIG. 1.

Each link LL1 to LL6 inside the link group 3 (resp., inside the mesh) can accommodate multiple mesh flows. Mesh flows are flows of packets with a unique source and destination node and a fixed path through the mesh network 1. Thus, mesh flows are realized by combining multiple subsequent single-hop transmissions on mesh links of the mesh network 1. One such mesh flow 6a from node C to node E is indicated in FIG. 2. Typically, however, a mesh flow is established between an ingress (access point AP or GW) and an egress (gateway node GW or AP) of the wireless mesh network 1, the mesh flow being used for transporting aggregates of user flows over the wireless mesh network 1. A further example of a mesh flow 6b is given in FIG. 3, the mesh flow 6b leading from an access point AP via three consecutive mesh points MP to a gateway node GW. For each link between two of the nodes, a one-hop QoS allocation 7a to 7e has to be established. The QoS allocations are defined as sets of QoS parameters which at least comprise a (minimum) bit rate $r_i$ for the mesh flow, being usually identical for all the QoS allocations 7a to 7e of the mesh flow 6b. Packet forwarding at the mesh relay nodes, i.e., mesh points MP, is realized based on local packet forwarding information, e.g., based on label-switching after a setup process of mesh flows was performed.

In order to maintain agreed service levels for the mesh flows 6a, 6b, traffic conditions at mesh links 2a, 2b, LL1 to LL6 have to be kept in certain bounds (when using a DiffServ like traffic handling model at links) or resource allocations have to be installed at links 2a, 2b or within link groups 3 when using an IntServ like traffic handling model. The combination of all single-hop traffic forwardings with their properties of average bit-rate, packet delay, drop-rate, etc., make up the overall service level of a mesh flow. On the other hand, the overall service quality (bitrate, delay, jitter) that a single mesh flow receives results from the service level at the different hops.

Mesh flows have an assigned service quality, e.g., an agreed bitrate and/or an agreed end-to-end delay. It is intended to place mesh flows in the mesh network without violating capacity constraints at any link 2a, 2b or within any link group 3 and without violating delay constraints. The existing constraints and service level agreements have to be met for a newly placed mesh flow as well as for existing mesh flows being affected by the newly placed mesh flow. Furthermore, it is intended to allow negotiating and providing agreements on service levels for mesh flows between the mesh network and users of the mesh network.

For managing mesh resources, thus, the local resource managers 4 ("single-hop resource managers") for links 2a, 2b or link groups 3 have to co-operate with one or multiple network capacity managers 5 ("multi-hop capacity managers") for combining single-hop transmissions to multi-hop mesh flows.

The local resource managers 4 are managing wireless resources on a per-hop basis and—if link-based resource reservation systems are applied—are installing resource allocations in MAC units, e.g., installing connections in WiMAX link systems. Link managers 4 are localized at mesh points MP where they have to interact with the flow forwarding units, local queuing systems for directing mesh flows to queues, and MAC units. Typically, these link resource managers MP are also used for a decentralized data storage of installed one-hop resource allocations (maybe in addition to a central information store/context space).

At least when installing new one-hop resource allocations, the local mesh managers 4 report flow-specific parameters such as the predicted production costs for the new flow and update information of other flows. Production costs are costs in terms of physical resource usage for transmitting bits. An example set of management information as it will be maintained in link resource managers has been given in table 2 above. The information is kept in lists for links and lists for installed one-hop resource reservations.

Figure 4:
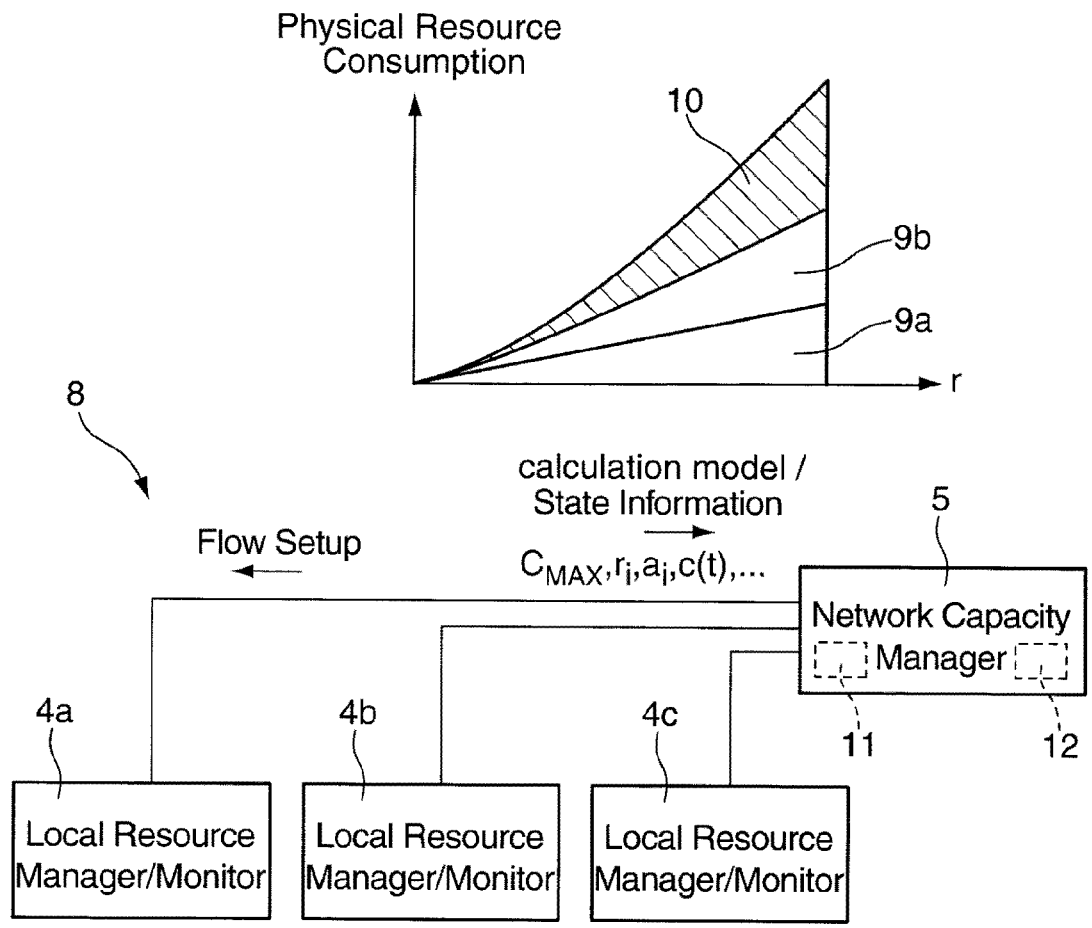
FIG. 4 shows a schematic diagram of an embodiment of a signaling system according to the invention, being adapted for performing mesh-wide capacity management in the wireless mesh network of FIG. 1.

A signaling system 8 for exchanging link parameters as well as link state information between link/link group resource managers 4a to 4c and the network capacity manager 5 is shown in FIG. 4. The information which is provided from the local resource managers 4a to 4c to the central network capacity manager 5 may comprise (but is not limited to) static system properties such as a maximum link or link group resource capacity $C_{max}$, and system state information, e.g., the installed one-hop resource allocations $r_i$, the corresponding mean production costs $a_i$, or possibly the current overall resource consumption c(t) based on measurements. This information may be used for determining if new one-hop allocations for a new mesh flow may be established on a particular link j using a pre-defined linear calculation model being based, e.g., on the following linear equation for a specific link i:

$$C_{phys,max} \leq c_{phys}(t) = \sum_i a_i \cdot r_i \qquad (2)$$

Yet, a system which is based on such a pre-defined calculation model using the linear equation (2) for estimating the (physical) resource consumption and packet forwarding performance on links when new flows have to be installed is limited in that non-linear technology-dependent and environment-dependent parameters as well as further not yet known link technologies and properties will not be taken into account.

When such parameters come into play, a simple addition of two user mesh flows 9a, 9b with identical bit-rates $r=r_1=r_2$ at a single link cannot be mapped to a physical resource consumption by a simple addition, even when the cost factors $a_j$ are taken into account, as these non-linear effects lead to a reactive load 10 (cf. FIG. 4) which is added to the physical resource consumption of the sum of the individual mesh flows 9a, 9b, the reactive load 10 increasing with increasing bit-rate, see the diagram of FIG. 4.

Typical causes for more complex relations between flow rates, physical resource consumption and packet transmission performance are inter-flow interferences in the wireless domain and load-based protocol overhead of MAC protocols, as this can be observed in IEEE 802.11 (WLAN) systems.

Thus, using a pre-defined calculation model e.g. of the type given by equation (2) has the drawback of not taking into account technology-dependent parameters which may be specific to versions of link systems—even of the same technology—and may probably also be environment specific, i.e. depending on where and how links or link groups are configured. Thus, a capacity management system for heterogeneous link technologies (heterogeneous carrier class mesh networks) being based on static calculation models does not allow adding new access technologies after the management system has been engineered and does not allow taking complex link- or link-group specific environment constraints into account.

Therefore, at the end of the mesh initialization phase or after new mesh nodes have been added in an incremental mesh setup process, or other significant changes to the network have occurred, the link resource managers 4a to 4c signal their link- or link-group specific calculation model, resp., information about their calculation model for mapping installed flows 6a, 6b to their resource consumption/flow traffic performance to a receiving unit 11 of the central network capacity manager 5. The calculation model may in particular take link- or link-group-specific characteristics into account. For instance, such a calculation model may include an algorithm for deriving the reactive load 10 from the bit-rates of the flows 9a, 9b, such that the reactive load may be accounted for when calculating the resource consumption for establishing an additional mesh flow.

For the signaling of the link- or link-group specific capacity calculation model to the central network capacity manager 5, one out of the following signaling methods and model representations may be used:

1) Signaling an index that selects one calculation model for a link/link group out of a set of pre-defined calculation models that are typically known both to the link managers as well as to the central capacity manager; 2) signaling a parameter description of a calculation model based on maps with known parameter values, the maps relating e.g. n-dimensions of input parameters to values of interest; 3) signaling of calculation models based on descriptions of mathematical equations, e.g., formulated in MathML, the mathematical equations being evaluated in an execution environment at the mesh capacity manager; and 4) signaling of program code in programming languages, e.g., script languages such as JavaScript, the program code being executed in a run-time environment of the network capacity manager 5, the program code using at least the state information as an input for providing the (physical) resource consumption at the affected mesh links/link groups as an output.

The network capacity manager 5 comprises a calculation unit 12 to perform different tasks which are related to mesh-wide mesh capacity management based on the signaled information about the calculation model, the state information, and possibly also the information about physical link properties: Admission control for new mesh flows and mesh optimization by re-arranging mesh flows in the mesh, e.g., for consuming fewer resources after some flows ended and shorter paths can be used. The centralized network manager 5 is used for performing these tasks for not overloading the links and link groups associated with the resource managers 4a to 4c.

For the admission control task, the multi-hop capacity manager(s) 5 decide which links 2a, 2b, LL1 to LL6 to combine to a mesh flow 6a, 6b and which resource allocations to configure at each link 2a, 2b, LL1 to LL6. For accepting new flows, the mesh capacity manager 5 has to calculate the new resource conditions after the new flow has been accepted, maybe for different possible options for placing the new mesh flow in the mesh network 1. Based on the calculations for the remaining resources and resulting mesh flow performance values, the network capacity manager 5 has to decide which path to choose for establishing the new mesh flow or whether the new mesh flow has to be rejected. The new mesh flow will be rejected if no valid paths through the mesh can be detected since for all possible paths, at least one of the calculated resource constraints is exceeded.

For the optimization task, the mesh flows in a mesh network have to be re-arranged. For performing the optimization, for various alternatives for placing mesh flows (either new setups or incremental changes), fitness functions for evaluating whether the setup complies with resource constraints as well as further (more complex) fitness functions for estimating new flow properties have to be applied. Optimization criteria for re-distributing mesh flows may be aiming at achieving an equal distribution of link usage while also taking short path lengths into account.

For performing admission control or for performing mesh re-configurations, the load distribution of a new situation has to be calculated in advance, which may be done in the way described above, as the resource consumption at links or at link groups can be calculated by knowing the current state of one-hop resource allocations at the links or within the link groups and the calculation model to be applied. By signaling information about the calculation model to be applied, the specifics of the link technologies may be hidden from the heterogeneous (technology-independent) mesh capacity manager 5.

Figure 5:
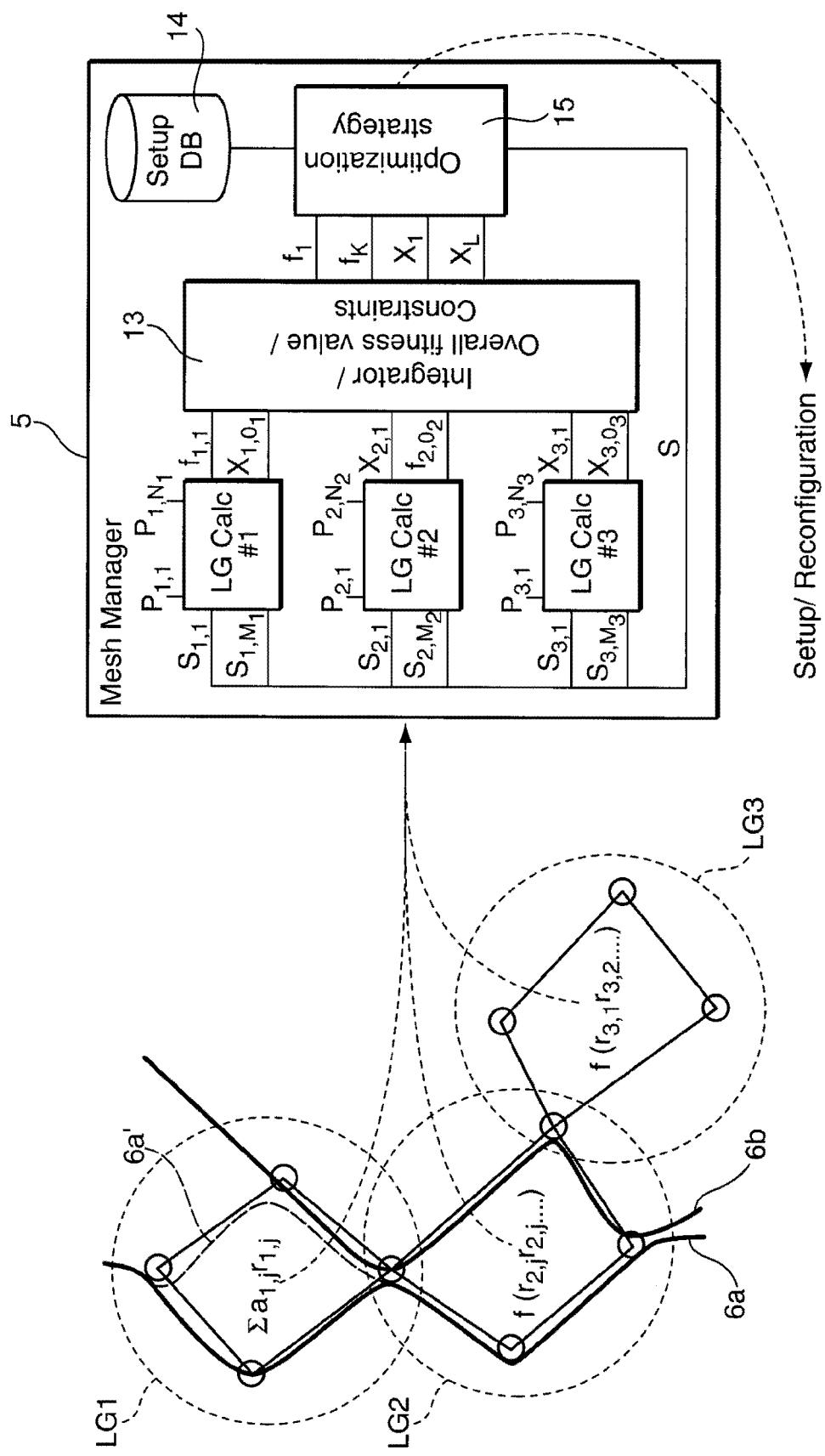
FIG. 5 shows an example of an implementation of a network capacity manager for performing mesh optimizations.

An example for performing such a mesh optimization process for three link groups LG1 to LG3 using a network capacity manager 5 is represented in FIG. 5. In the present example, two traffic flows (pipes) 6a, 6b crossing the first and second link groups LG1, LG2 are shown.

The first link group LG1 uses a linear calculation model according to equation (2) (see above). The second and third link groups LG2, LG3 use a non-linear function for relating the bit rates $r_{2,j}$, $r_{3,j}$ to the resource consumption on the respective links, the information about the respective calculation models being provided to the network capacity manager 5.

The network capacity manager 5 considers using a different path 6a' for the first traffic flow 6a for mesh optimization. For determining whether or not the new path 6a' should be established, a (hypothetical) network state $S_{i,j}$ for each one-hop allocation of each link j in a respective link group LGi (i=1, 2, 3) when the path 6a' is used instead of the path 6a is provided to a respective calculating instance LG calc #1 to LG calc #3 forming part of the calculation unit 12 referred to above. The network state $S_{i,j}$ typically represents a (slight) deviation from a current network state, being available as state information stored in a database 14 of the network capacity manager 5.

For the given network state $S_{i,j}$ and pre-defined link parameters $P_{i,j}$ corresponding to physical link parameters (estimated production costs etc., as described above) and possibly link state information, fitness values $f_{1,k}$, $f_{2,k}$, . . . related to flow performance characteristics such as a resource consumption and/or a delay are determined for all links j of the respective link group LG1 to LG3. Each calculating instance LG calc #1 to LG calc #3 may provide more than one fitness value $f_{1,k}$, $f_{2,k}$, which may correspond to different flow performance characteristics. For instance, a fitness value may correspond to the maximum value of free resources (as a sum over all links j) on a respective link group LG1 to LG3, or on a minimum value of free resources which are available on that link j of the link group LG1 to LG3 having maximum resource consumption, each for a given network state $S_{i,j}$.

In the present example, so-called excludes/constraints, i.e. (binary) values $X_{1,k}$, $X_{2,k}$, . . . are also provided as an output of the calculating instances LG calc #1 to LG calc #3, indicating that the resources on the given link group LG1 to LG3 are insufficient for the given network state $S_{i,j}$ based on the link parameters $P_{i,j}$.

Based on the results of the calculating instances LG calc #1 to LG calc #3, overall fitness values $f_1$ to $f_k$, resp., exclude values (constraints) $X_1$ to $X_L$ are calculated for all link groups LG1 to LG3 in an integrator unit 13 for the given network state $S_{i,j}$ and given link parameters $P_{i,j}$. The fitness functions $f_k$ together with the constraints $X_L$ are then provided to an optimization unit 15. Depending on the (linear or non-linear) nature of the fitness function (related to the linear or non-linear nature of the resource consumption model), a numerical optimization strategy is performed. It will be understood that alternatively, the optimization may be based on solving linear equations, etc. The resulting optimization, aiming e.g. to generate an equal distribution of traffic in the network, may then lead to a re-configuration of the network, for example by using the new path 6a' instead of the original path 6a. Subsequently, the optimization unit 15 may try further modifications of the current network state as stored in the database 14, e.g. by modifying the second path 6b, in order to optimize overall network performance.

In summary, as stated above, in particular in environments using different link technologies/different local link properties, static calculation models mainly realize trade-offs which are not optimal, whereas using the above signaling approach, different calculation models may be applied in a flexible way. One skilled in the art will appreciate that the concepts described herein are not limited to wireless mesh networks, but may also apply to mesh networks based on wire-line technology or on heterogeneous mesh networks using both wireless and wire-line link technology.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Also, the description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for mesh-wide capacity management in a mesh network comprising mesh links of different link technologies or with different link configurations, the method comprising:

signaling from at least one link resource manager implemented by at least one processor associated with a mesh link or a group of mesh links of the mesh network, information indicative for a link- or link group-specific calculation model which is specific for a link technology or a link configuration of the mesh link or the group of mesh links associated with the link resource manager to at least one processor-implemented network capacity manager, the information allowing the at least one network capacity manager to apply the link- or link group-specific calculation model to calculate at least one flow performance measure for establishing at least one packet-based traffic flow on the mesh link or on the group of mesh links;
wherein the step of signaling information indicative for the link- or link group-specific calculation model comprises signaling an index indexing one out of a set of pre-defined calculation models known to the network capacity manager.

2. The method according to claim 1, further comprising:
signaling at least one physical link property and/or link state information about the mesh link or the group of mesh links from the link resource manager to the network capacity manager.

3. The method according to claim 1, wherein the step of signaling information indicative for the link- or link group-specific calculation model comprises signaling mathematical equations to be evaluated by the network capacity manager.

4. The method according to claim 1, wherein the step of signaling information indicative for the link- or link group-specific calculation model comprises signaling a program code to be executed by the network capacity manager.

5. The method according to claim 1, wherein the network capacity manager performs calculations for establishing new mesh flows and/or for optimizing a distribution of mesh flows in the mesh network, the calculations being based on the information indicative for the calculation model in addition to link state information about one-hop resource allocations on the mesh links.

6. A link resource manager for a mesh link or for a group of mesh links of a mesh network, comprising:
at least one processor configured to signal information indicative for a link- or link group-specific calculation model which is specific for a link technology or a link configuration of the mesh link or the group of mesh links associated with the link resource manager to at least one processor-implemented network capacity manager, the information allowing at least one network capacity manager to apply the link- or link group-specific calculation model to calculate at least one flow performance measure for establishing at least one packet-based traffic flow on the mesh link or on the group of mesh links;
wherein the information indicative for the link- or link group-specific calculation model is selected from the group consisting of: an index for indexing one out of a set of pre-defined calculation models known to the network capacity manager, mathematical equations to be evaluated by the network capacity manager, and a program code to be executed by the network capacity manager.

7. A network capacity manager, comprising:
a receiver configured to receive from at least one processor implemented link resource manager information indicative for a link- or link group-specific calculation model which is specific for a link technology or a link configuration of a mesh link or a group of mesh links associated with the link resource manager, the information allowing the at least one network capacity manager to apply the link- or link group-specific calculation model to calculate at least one flow performance measure for establishing at least one packet-based traffic flow on at least one mesh link or on at least one group of mesh links, and
a processor-implemented calculation unit configured to perform calculations for establishing new mesh flows and/or for optimizing a distribution of mesh flows in the mesh network based on the information indicative for the link- or link group-specific calculation model in addition to link state information about one-hop resource allocations on the mesh links;
wherein the information indicative for the link- or link group-specific calculation model is selected from the group consisting of an index for indexing one out of a set of pre-defined calculation models known to the network capacity manager, mathematical equations to be evaluated by the network capacity manager, and a program code to be executed by the network capacity manager.

8. The network capacity manager according to claim 7, wherein the calculation unit is configured to determine a resource consumption as a flow performance measure for establishing at least one packet-based traffic flow on the at least one mesh link or the at least one group of mesh links, and to compare the determined resource consumption to a maximum resource capacity of the at least one mesh link or the at least one group of mesh links on which the at least one traffic flow is to be established.

9. A signaling system for a mesh network, comprising:
at least one processor-implemented network capacity manager;
a plurality of processor-implemented link resource managers, each being associated with a respective mesh link or a group of mesh links of the mesh network and being configured to signal information indicative for a link- or link group-specific calculation model which is specific for a link technology or a link configuration of the mesh link or the group of mesh links associated with the link resource manager to at least one processor-implemented network capacity manager, the information allowing the at least one network capacity manager to apply the link- or link group-specific calculation model to calculate at least one flow performance measure for establishing at least one packet-based traffic flow on the mesh link or on the group of mesh links, wherein the information allowing the at least one network capacity manager to apply the link- or link group-specific calculation model is selected from the group consisting of: an index for indexing one out of a set of pre-defined calculation models known to the network capacity manager, mathematical equations to be evaluated by the network capacity manager, and a program code to be executed by the network capacity manager;
the at least one network capacity manager comprising:
a receiver configured to receive from at least one of the link resource managers information indicative for a link- or link group-specific calculation model which is specific for a link technology or a link configuration of a mesh link or a group of mesh links associated with the at least one link resource manager, the information allowing the at least one network capacity manager to apply the link- or link group-specific calculation model to calculate at least one flow performance measure for establishing at least one packet-based traffic flow on at least one mesh link or on at least one group of mesh links; and
a processor-implemented calculation unit configured to perform calculations for establishing new mesh flows and/or for optimizing a distribution of mesh flows in the mesh network based on the information indicative for the link- or link group-specific calculation model in addition to link state information about one-hop resource allocations on the mesh links.

10. A mesh network, comprising:
a plurality of mesh links; and
a signaling system, comprising:
at least one processor-implemented network capacity manager,
a plurality of processor-implemented link resource managers, each being associated with a respective mesh link or a group of mesh links of the mesh network and being configured to signal information indicative for a link- or link group-specific calculation model which is specific for a link technology or a link configuration of the mesh link or the group of mesh links associated with the link resource manager to at least one processor-implemented network capacity manager, the information allowing the at least one network capacity manager to apply the link- or link group-specific calculation model to calculate at least one flow performance measure for establishing at least one packet-based traffic flow on the mesh link or on the group of mesh links, wherein the information allowing the at least one network capacity manager to apply the link- or link group-specific calculation model is selected from the group consisting of: an index for indexing one out of a set of pre-defined calculation models known to the network capacity manager, mathematical equations to be evaluated by the network capacity manager, and a program code to be executed by the network capacity manager;

the at least one network capacity manager comprising:
a receiver configured to receive from at least one of the link resource managers information indicative for a link- or link group-specific calculation model which is specific for a link technology or a link configuration of a mesh link or a group of mesh links associated with the at least one link resource manager, the information allowing the at least one network capacity manager to apply the link- or link group-specific calculation model to calculate at least one flow performance measure for establishing at least one packet-based traffic flow on at least one mesh link or on at least one group of mesh links; and
a processor-implemented calculation unit configured to perform calculations for establishing new mesh flows and/or for optimizing a distribution of mesh flows in the mesh network based on the information indicative for the link- or link group-specific calculation model in addition to link state information about one-hop resource allocations on the mesh links.

* * * * *